United States Patent [19]

Councilman

[11] Patent Number: 4,545,545
[45] Date of Patent: Oct. 8, 1985

[54] DRAG FOR SPINNING REELS

[75] Inventor: Richard R. Councilman, Collinsville, Okla.

[73] Assignee: Brunswick Corporation, Skokie, Ill.

[21] Appl. No.: 568,535

[22] Filed: Jan. 5, 1984

Related U.S. Application Data

[63] Continuation of Ser. No. 447,197, Dec. 6, 1982, abandoned, which is a continuation of Ser. No. 290,061, Aug. 4, 1981, abandoned.

[51] Int. Cl.$^4$ ............................................. A01K 89/02
[52] U.S. Cl. .............................................. 242/84.5 R
[58] Field of Search ................... 242/84.5 A, 84.5 R, 242/84.51 A, 84.51 R, 84.21 R

[56] References Cited

U.S. PATENT DOCUMENTS

| | | | |
|---|---|---|---|
| 2,687,855 | 8/1954 | Shakespeare et al. | 242/84.5 A |
| 2,863,617 | 12/1958 | Chapin et al. | 242/84.21 R |
| 4,193,561 | 3/1980 | Stiner | 242/84.51 A |
| 4,238,085 | 12/1980 | Jansson et al. | 242/84.2 G |
| 4,291,846 | 9/1981 | Carpenter | 242/84.21 R |

FOREIGN PATENT DOCUMENTS 1020118  11/1952  France .......................... 242/84.21 R Primary Examiner—Billy S. Taylor
Attorney, Agent, or Firm—Wood, Dalton, Phillips, Mason & Rowe

[57] ABSTRACT

A rear mounted drag mechanism (50) for a fishing reel (1) having a shaft (300) rotatable to pay out fishing line. The drag mechanism (50) has at least one member (428) keyed to the shaft (300) for rotation therewith and for axial movement therealong and having at least one radially outward extending surface (434) coupled thereto and has at least one other member (440) restrained against rotation and movable toward and away from said one member (428). At least a pair of washers (448) separate said radial surface (434) from the reel housing (400) and from said washer (448). Means (416, 414, 450) are provided to selectively exert a bias upon the other member (440) to create frictional interengagement between said other member (440), said washers (448) and said radial surface (434) and said housing (400) thereby exerting a drag effect against rotation of said shaft (300).

6 Claims, 5 Drawing Figures

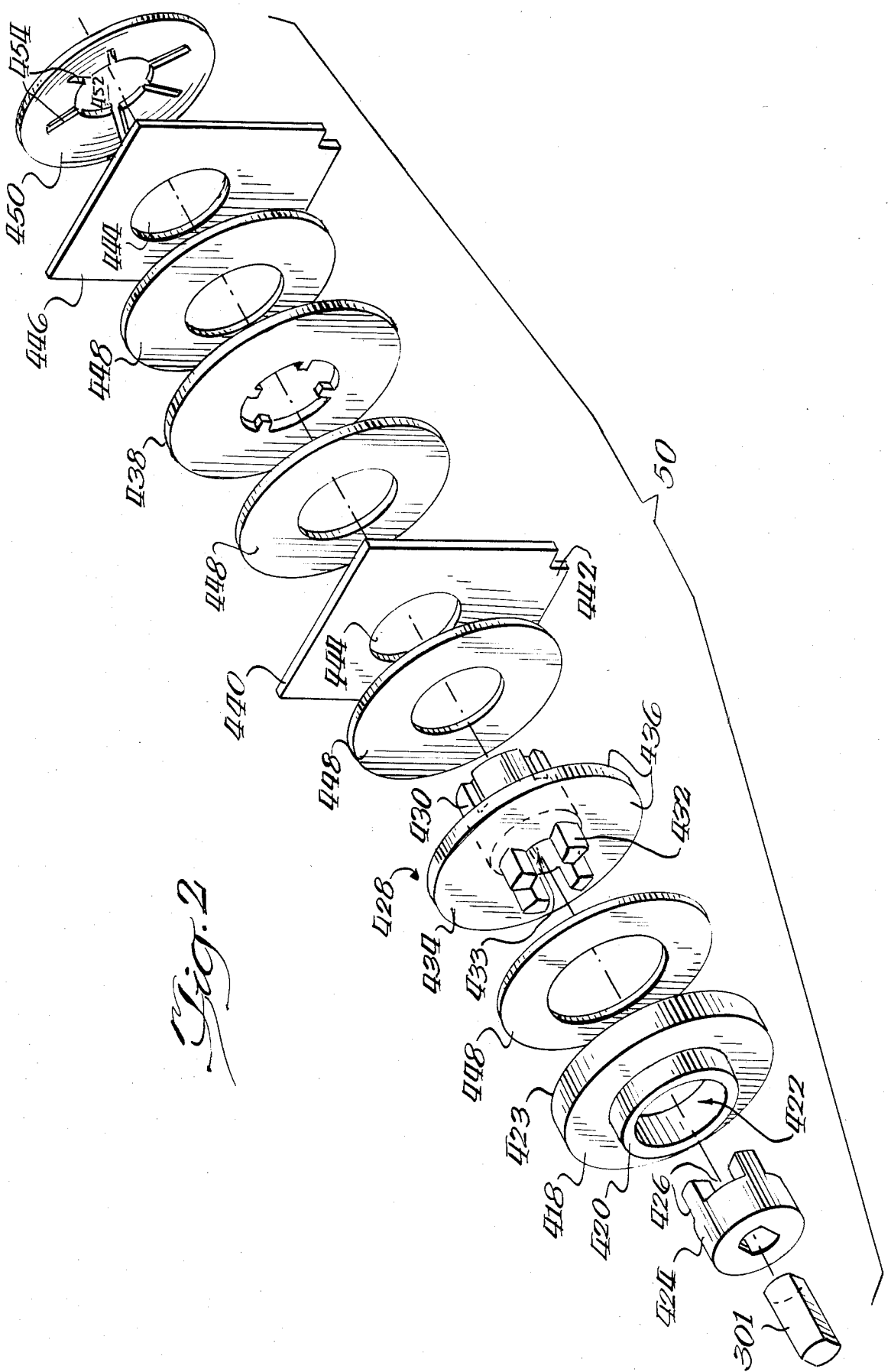

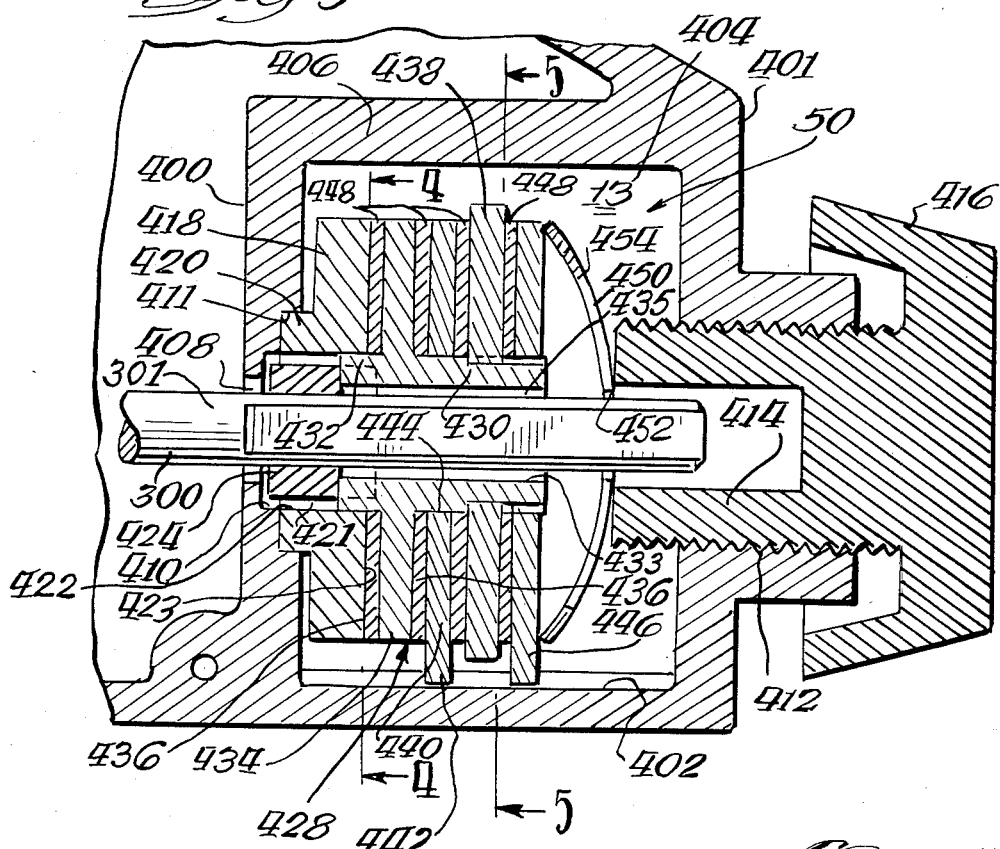
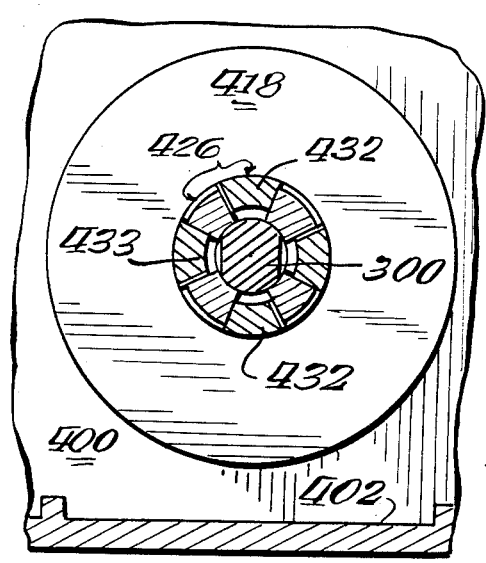
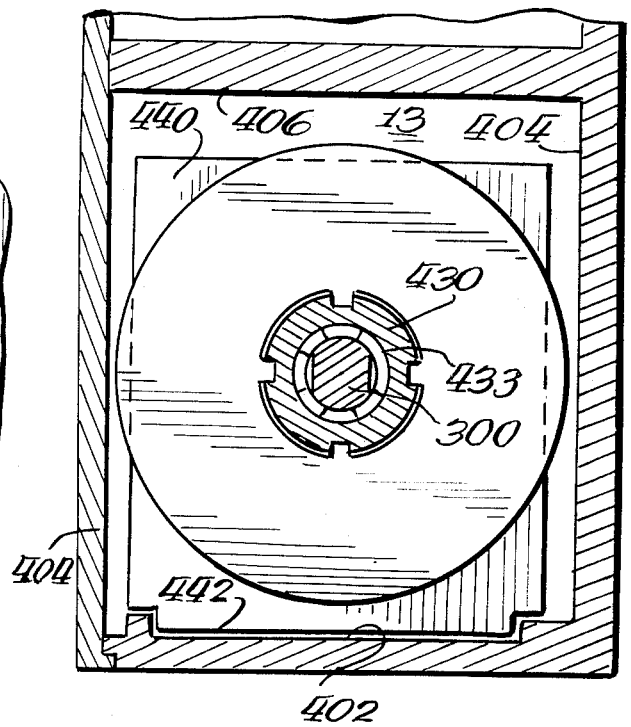

DRAG FOR SPINNING REELS

This application is a continuation of application Ser. No. 447,197, filed Dec. 6, 1982, now abandoned, which was a continuation of application Ser. No. 290,061, filed Aug. 4, 1981, now abandoned.

TECHNICAL FIELD

This invention relates to spinning reels and more particularly to the drag mechanisms associated therewith.

BACKGROUND ART

It has been known to those skilled in the art to provide a fishing reel with a mechanism whereby fishing line may be payed out during the landing of a fish to effectively prevent the fishing line from snapping. Typically these paying out means incorporate drag mechanisms so that the point at which the line begins to be payed out, i.e., the pull on the line by the fish, may be selectively determined.

One known approach to selectively apply a breaking force or drag against the paying out of line has been the location of a drag mechanism at the rear of the reel in coaxial alignment with the shaft of the reel which rotates in response to the pay out fishing line. In practice, however, the rear mounted drag mechanisms have posed manufacturing problems which tend to make these mechanisms expensive and therefore includable in only the most expensive of reels. Specifically the problems in manufacturing are concerned with the close tolerances required to rotatably support and maintain the alignment of the shaft to permit it to freely rotate for smooth operation of the reel when drag is not required while at the same time permitting drag to be selectively imposed upon the shaft.

The present invention is directed toward overcoming the problems heretofore associated with rear mounted drag mechanisms.

DISCLOSURE OF THE INVENTION

The present invention sets forth a spinning reel incorporating a rear mounted drag with alternating, radially extending surfaces which rotate with the shaft and surfaces which are fixed within the reel housing against rotation. Selectively exerting a bias causes the aforementioned surfaces to frictionally interfere with one another and thereby exert a braking or dragging effect against rotation of the shaft.

DESCRIPTION OF THE DRAWINGS

FIG. 2 is an exploded perspective view of an embodiment of the drag mechanism of this invention;

FIG. 3 is a section view a portion of the reel illustrating the embodiment of the drag mechanism shown in FIG. 2 as assembled;

FIG. 4 is a section view taken along line 4—4, of the drag mechanism shown in FIG. 3; and FIG. 5 is a section view, taken along line 5—5 of the drag mechanism shown in FIG. 3.

DESCRIPTION OF BASIC STRUCTURE AND OPERATION OF FISHING REEL

Figure 1:
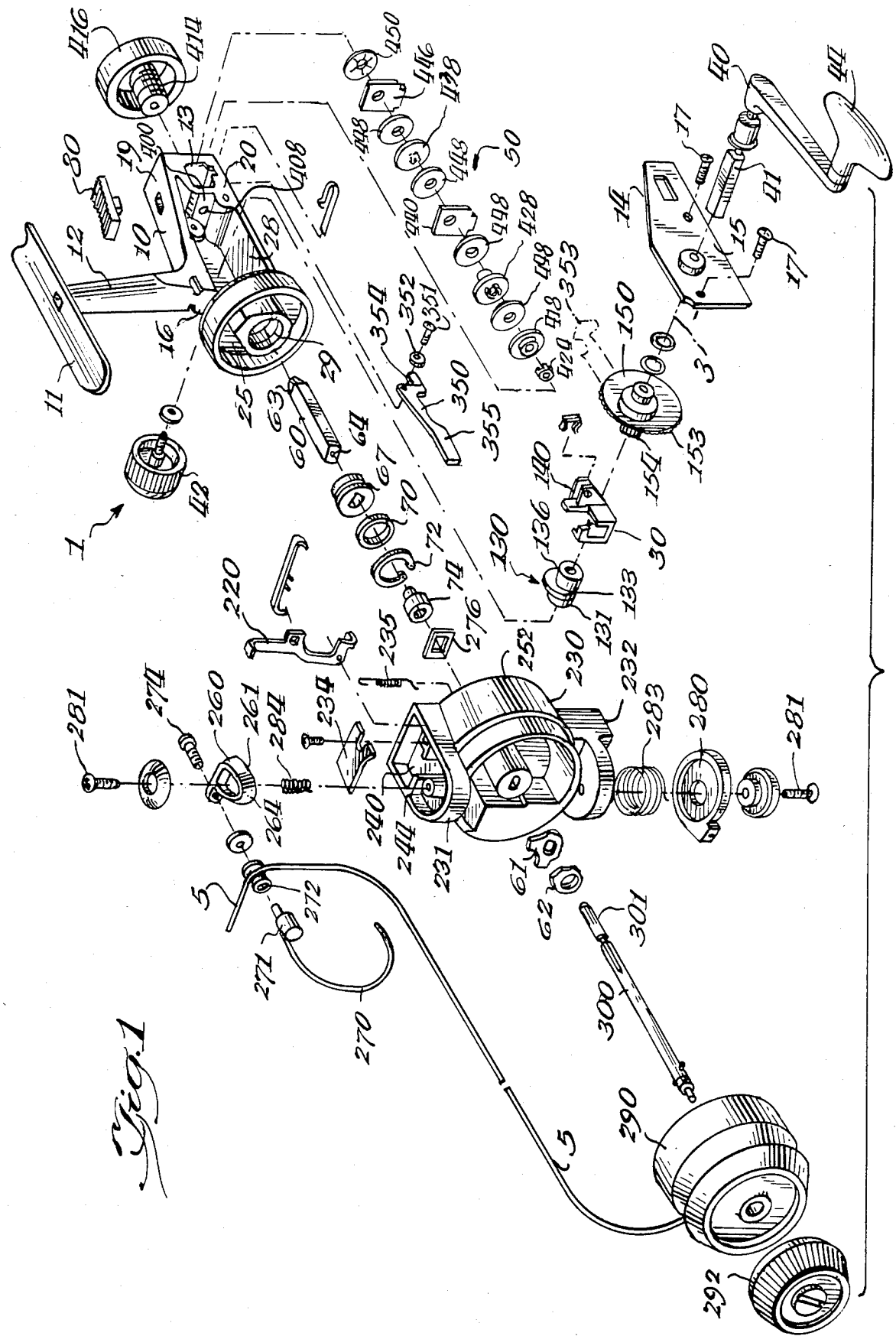
FIG. 1 is an exploded perspective view of the fishing reel incorporating the drag mechanism of this invention.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely pay out from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in a bearing 16 that is part of the side of the housing 10 and coaxial with bearing 15 (but now shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever retainer 76 are mounted on the pinion 60.

The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to pay out from the spool 290. During casting, this way out of the line is quite rapid, thus, the fisherman using this open faced style fishing reel is obligated to use his finger to snub the line to arrest the pay out since neither the rewind or line retrieval mode (the winding of the line about the spool 90 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A self-centering bail mechanism is shown that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a preselected position for opening the bail at the casting position. The same mechanism acts as an antireverse device for the reel so that the rotor can only be rotated "backward" less than one revolution.

DESCRIPTION OF THE PREFERRED EMBODIMENTS

Turning to FIGS. 1 through 5 an embodiment of the rear mounted drag mechanism 50 of this invention is illustrated. As seen in FIGS. 1 and 3 the reel housing 10 has located therein a partition 400 opposed by a rear wall 401 of the reel housing 10. The partition 400 and rear wall 401 are separated by a flat troughed bottom 402, a pair of opposing sidewalls 404 and a top 406 all of which cooperate to form a drag pocket 13 to house the drag mechanism 50. The partition 400 has a shaft accommodating center bore 408 larger in diameter than the shaft 300, extending therethrough having a first counter-sink 410 and a larger diameter second countersink 411 directed toward the drag pocket 13. The rear wall 401 of the drag pocket 13 has a threaded bore 412 coaxial with the center bore 408 of the partition 400 to receive a threaded post 414 having attached thereto outer, manually manipulable knob 416.

As seen in FIGS. 1–3 the drag mechanism 50 includes a disc-shaped base bushing 418. The base bushing 418 is of a diameter to freely rotate within the drag pocket 13 and has a coaxial boss 420 which is received into and piloted by the second countersink 411. Axially extending through the base bushing 418 is a bushing bore 422 of a diameter to register with the first countersink 410. The face of the base bushing 418 opposing the boss 420 is perpendicular to the axis of the shaft 300 and in cooperation with the bushing bore 422 defines an annular bushing face 423.

The shaft back end 301 of the reel 1 extends axially through the center bore 408, through the drag pocket 13 and terminates in the region of the threaded bore 412 in the rear wall 401. Keyed to the back end 301 for relative axial movement therealong and rotation therewith is a cylindrical coupling 424. The keying of the coupling 424 to the shaft back end 301 may be provided by cooperative splining such as the double "D" splines as illustrated in the drawings particularly FIGS. 2 and 4. The coupling 424 is smaller in diameter than, and is disposed for the most part within, the bushing bore 422 and, in its forwardmost position abuts the bottom of the first countersink 410. The end of the coupling 424 opposing the partition 400 has four radially outward extending slots 426. For ease of assembly, the slots 426 are of equal size and are equally spaced about the end of the coupling 424.

Connected to the coupling 424 for rotation therewith is a drag driver 428. Accordingly, the drag driver 428 has a cylindrical driver body 430 with four fingers 432 at one end thereof matingly received by the slots 426. The driver body 430 has an outer diameter slightly larger than that of the coupling 424 and is closely received and piloted for rotation with the shaft 300 by the bushing bore 422. A driver bore 433 axially extends through the driver body to pass the shaft back end 301 without engagement thereof.

Contiguous to the base bushing 418 the drag driver 428 has a radially outward extending disc 434. As seen in the drawing, the disc 434 is of a diameter similar to that of the base bushing 418 so as not to interferingly engage the boundaries of the drag pocket 13. The opposing annular surfaces of the disc 434 define drag faces 436.

Keyed to the end of the drag driver body 430 opposing the fingers 432 for rotation therewith as by cooperative splining is a drag washer 438. The drag washer 438 is spaced from the disc 434 of the drag driver 428 and, due to the aforementioned splining rotates with the drag driver 428 while, at the same time, being movable along the splined portion of the drag driver body 430.

Disposed between the drag driver disc 434 and the drag washer 438 is a forward stationary washer 440. As best seen in FIGS. 2 and 5 the forward stationary washer 440 is rectangular or square and has a base 442 to mate with the troughed bottom 402 of the drag pocket 13. Centrally located in the forward stationary washer 440 is a washer bore 444 to receive the drag driver body 430 for rotation therein. From the foregoing it follows that the forward stationary washer 440 may move axially with respect to the shaft 300 either toward or away from the drag driver disc 434 but is restrained by the bottom 402 against rotation.

Located close to drag washer 438 and to the rear thereof (to right as viewed in FIG. 3) is a rear stationary washer 446. The rear stationary washer 446 is identical in structure and function to the forward stationary washer 440 and in cooperation therewith spans the drag washer 438.

Interposed between the base bushing 418 and the drag driver disc 434 is a friction washer 448. Likewise similar friction washers 448 are interposed between the drag driver disc 434 and forward stationary washer 440 and between the drag washer 438 and the aforementioned forward and rear stationary washers 440 and 446. The friction washers 448 have outer diameters comparable to that of the disc 434 and base bushing 418 and have axial holes to permit free relative rotation between the drag driver body 430 and the friction washers 448.

Abutting the rear stationary washer 446 is a spheroid spring washer 450. The spring washer 450 has an axial spring bore 452 to pass the shaft back end 301 and a plurality of radial apertures 454 directed therefrom subject to an axial force. As seen in FIG. 3, the threaded post 414 abuts the spring washer 450 in the vicinity of the spring bore 452. Manual turning of the knob 416 to reduce or increase the drag forces the post 414 bears against and somewhat deforms the spring washer 150 in the region provided by the apertures 454. This in turn selectively exerts a bias upon the rear stationary washer 446.

From the foregoing the operation of the drag mechanism 50 can be set forth. In the release, or no drag position, the drag knob 416 is disposed at its outermost position such that the threaded post 414 does not forcibly bear against the spring washer 450. In this position the coupling 424 and connected drag driver 428 are free to axially move along the shaft back end 301. The base bushing 418, drag washer 438, friction washers 448 and forward and rear stationary washers 440 and 446 are likewise free to move axially upon the driver body 430. Accordingly, the aforementioned elements, as the shaft 300 rotates to pay out fishing line, become axially positioned so as to minimize frictional interengagement and freely permit shaft 300 rotation.

To apply a braking or drag effect against the rotation of the shaft 300 and the resultant pay out of fishing line, the drag mechanism 50 is actuated by the manual rotation of the knob 416 causing the post 414 to forcibly bear against the spring washer 450. Continued rotation of the knob 416 causes the spring washer 450 to engage the rear stationary washer 446 and to axially collapse the drag mechanism 50. With the base bushing 418 securely seated in the second countersink 411, continued rotation of the knob 416 causes the spring washer 450 to exert a bias upon rear stationary washer 446 which is transmitted through the remainder of the drag mechanism 50. The aforementiond bias, selectively increased or decreased by rotation of the knob 416, results in the frictional interaction between the forward and rear stationary washers 440 and 446 and the disc 434 and drag washer 438 through the friction washers 448. The friction generated resists the rotation of the drag driver 428, the connected coupling 424 and ultimately the shaft 300 thereby effectively producing the desired drag effect.

While I have described certain embodiments it is to be understood that modifications may be made without departing from the scope of this invention. For example more or less frictionally engaging elements may be incorporated in the drag mechanism for lighter or heavier duty reels.

I claim:

1. In a fishing reel having a housing with a partition defining a pocket near one end thereof, a shaft in the housing extending into the pocket through an enlarged opening in the partition, the shaft having its rotation controlled by an improved drag mechanism comprising:
    a drag driver in the pocket having at least a portion encircling the shaft immediately radially outwardly from the shaft and being spaced radially therefrom;
    coupling means in the pocket including a portion spaced axially along the shaft relative to the drag driver portion and keyed to the shaft for rotation therewith;
    means for clutchingly connecting the drag drive to the coupling means and being operatively driven by the coupling means, the drag driver having at least one radially outward extending disc member;
    bushing means piloted in the opening in the pocket and having a bore spaced radially from the coupling means, the drag driver having a cylindrical portion piloted in the bore in the bushing means for supporting the drag driver in said radially spaced relationship to the shaft;
    a washer member freely encircling a portion of the drag driver and being keyed to the housing against rotation, the washer member being movable in the axial direction toward and away from a radial surface on the disc member of the drag driver, the washer member having a surface radially of the shaft;
    at least a pair of friction washers encircling the drag driver, one friction washer separating the disc member of the drag driver from the bushing means and the other friction washer separating the disc member from the washer member; and
    means for selectively exerting a bias upon the washer member to create frictional interference between the surface of the disc member on the drag driver, friction washers and washer member producing a braking effect on the shaft,
    whereby nutation of the shaft is allowed by reason of the spaced relationship between the shaft and said portion of the drag driver.

2. The fishing reel described in claim 1 wherein the means for exerting a bias includes a spring washer (450).

3. In a fishing reel having a housing with a partition defining a pocket therein, a shaft in the housing extending into the pocket through an enlarged opening in the partition, the shaft being rotatable and axially oscillatable, an improved drag mechanism for controlling the rotation of the shaft, the improved drag mechanism being characterized by;

drag driver means including a portion immediately radially outwardly from the shaft and loosely encircling the shaft;

coupling means including a portion spaced axially along the shaft relative to the drag driver portion and keyed to the shaft for rotation therewith for providing for axial oscillation of the shaft;

means operatively connecting the drag driver means with the coupling means;

a disc member fixed on the drag driver means for rotation with the drag driver means;

bushing means guiding rotation of the drag driver means and having an axially extending cylindrical portion piloted in a bore around the opening in the partition to prevent radial displacement of the bushing means relative to the shaft, the bushing means having a central bore with a portion of the bore being spaced from the coupling means, the drag driver means having a cylindrical portion rotatably piloted in the bore in the bushing means, a drag washer keyed to another cylindrical portion of the drag driver means for rotation therewith and for axial movement therealong;

at least one stationary washer interposed between the disc member and the drag washer, the stationary washer being fixed against rotation with respect to the housing and being movable toward and away from the disc member;

a friction washer interposed between the disc member and the housing, a second friction washer interposed between the disc member and stationary washer and a third friction washer interposed between the stationary washer and the drag washer; and means for selectively exerting a bias upon the drag washer to create frictional interference between the disc member, the bushing means, friction washers, drag washer and stationary washer to produce a braking effect on the shaft.

4. The fishing reel described in claim 3 wherein the first friction washer is interposed between the disc and the bushing means.

5. The fishing reel described in claim 3 wherein the means for exerting bias is a spring washer engaged by a rear mounted knob.

6. The fishing reel described in claim 3 further including another stationary washer separated from the drag washer by at least one friction washer, the biasing means acting upon the drag washer through the another stationary washer and the separating friction washer.

* * * * *